US011636850B2

(12) United States Patent
Iyer

(10) Patent No.: US 11,636,850 B2
(45) Date of Patent: Apr. 25, 2023

(54) METHOD, SYSTEM, AND DEVICE FOR PERFORMING REAL-TIME SENTIMENT MODULATION IN CONVERSATION SYSTEMS

(71) Applicant: Wipro Limited, Bangalore (IN)

(72) Inventor: Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 300 days.

(21) Appl. No.: 16/937,892

(22) Filed: Jul. 24, 2020

(65) Prior Publication Data

US 2021/0358488 A1    Nov. 18, 2021

(30) Foreign Application Priority Data

May 12, 2020    (IN) .............................. 202041019937

(51) Int. Cl.
*G10L 15/18* (2013.01)
*G10L 13/10* (2013.01)
(Continued)

(52) U.S. Cl.
CPC .......... *G10L 15/1815* (2013.01); *G06T 13/40* (2013.01); *G06V 40/174* (2022.01);
(Continued)

(58) Field of Classification Search
CPC ............. G10L 15/1807; G10L 15/1815; G10L 15/1822; G10L 15/183; G10L 15/19;
(Continued)

(56) References Cited

U.S. PATENT DOCUMENTS 6,505,152 B1 *  1/2003  Acero ..................... G10L 13/04
                                                        704/E13.007
6,847,931 B2     1/2005  Addison et al.
                         (Continued)

OTHER PUBLICATIONS

Schröder, Marc, et al. "The German text-to-speech synthesis system MARY: A tool for research, development and teaching." International Journal of Speech Technology 6.4 (2003): 365-377. (Year: 2003).*

(Continued)

*Primary Examiner* — Jesse S Pullias
*Assistant Examiner* — Michael C. Lee
(74) *Attorney, Agent, or Firm* — Finnegan, Henderson, Farabow, Garrett & Dunner, LLP

(57) ABSTRACT

A method and system for performing real-time sentiment modulation in conversation systems is disclosed. The method includes generating an impact table comprising a plurality of sentiment vectors and a plurality of emotion vectors associated with the plurality of sentences. The method further includes generating for each of the plurality of sentences, a dependency vector based on the associated sentiment vector and the associated emotion vector. The method further includes stacking the dependency vector generated to generate a waveform representing variance in sentiment and emotions across words within the plurality of sentences. The method further includes altering at least one portion of the waveform based on a desired emotional output to generate a reshaped waveform. The method further includes generating a set of rephrased sentences associated with the at least one portion, based on the reshaped waveform, the set of sentences, a user defined sentiment output.

17 Claims, 11 Drawing Sheets

(51) Int. Cl.

| | |
|---|---|
| *G10L 15/25* | (2013.01) |
| *G10L 25/63* | (2013.01) |
| *G10L 15/22* | (2006.01) |
| *G06T 13/40* | (2011.01) |
| *G10L 25/90* | (2013.01) |
| *G06V 40/16* | (2022.01) |

(52) U.S. Cl.
CPC ............ *G10L 13/10* (2013.01); *G10L 15/22* (2013.01); *G10L 15/25* (2013.01); *G10L 25/63* (2013.01); *G10L 25/90* (2013.01)

(58) Field of Classification Search
CPC ......... G10L 13/08; G10L 13/10; G10L 15/22; G10L 15/25; G10L 25/63; G10L 25/90; G06V 40/174; G06T 13/40
See application file for complete search history.

(56) References Cited

U.S. PATENT DOCUMENTS

| | | | | |
|---|---|---|---|---|
| 8,812,171 | B2* | 8/2014 | Filev | G06N 3/006 |
| | | | | 701/1 |
| 9,430,461 | B2* | 8/2016 | Baughman | G06F 16/334 |
| 11,055,119 | B1* | 7/2021 | Silverstein | G10L 15/26 |
| 11,170,175 | B1* | 11/2021 | Kohli | G06F 40/284 |
| 11,194,971 | B1* | 12/2021 | Dobranic | G06V 10/40 |
| 2003/0110450 | A1 | 6/2003 | Sakai | |
| 2003/0125949 | A1* | 7/2003 | Okutani | G10L 13/07 |
| | | | | 704/258 |
| 2009/0144366 | A1 | 6/2009 | Lyle | |
| 2013/0218568 | A1* | 8/2013 | Tamura | G10L 13/033 |
| | | | | 704/260 |
| 2015/0286710 | A1 | 10/2015 | Chang et al. | |
| 2016/0049094 | A1* | 2/2016 | Gupta | G09B 9/00 |
| | | | | 434/185 |
| 2019/0050875 | A1* | 2/2019 | McCord | G06F 40/30 |
| 2019/0147043 | A1* | 5/2019 | Moskowitz | A61B 5/165 |
| | | | | 704/9 |
| 2019/0297042 | A1* | 9/2019 | Prabhu | G06F 3/04842 |
| 2020/0135039 | A1* | 4/2020 | Kama | G06V 40/174 |
| 2020/0193353 | A1* | 6/2020 | Weisman | G06Q 10/06393 |
| 2020/0218781 | A1* | 7/2020 | Takano | G06Q 30/016 |
| 2020/0302952 | A1* | 9/2020 | Pinkus | H04W 4/80 |
| 2021/0264909 | A1* | 8/2021 | Reece | G10L 15/22 |
| 2021/0366462 | A1* | 11/2021 | Yang | G06F 40/30 |

OTHER PUBLICATIONS

Tamura, Masatsune, et al. "Unit selection speech synthesis using multiple speech units at non-adjacent segments for prosody and waveform generation." 2010 IEEE International Conference on Acoustics, Speech and Signal Processing, 2010, pp. 4802-4805. (Year: 2010).*

Rybárová, Renata, et al. "GUI for interactive speech synthesis." 2016 International Conference on Systems, Signals and Image Processing (IWSSIP). IEEE, 2016, pp. 1-4. (Year: 2016).*

Wang, Yuxuan, et al. "Tacotron: Towards end-to-end speech synthesis." arXiv preprint arXiv:1703.10135 (2017), pp. 1-10. (Year: 2017).*

Rajendran, Vaibhavi, et al. "Prosody detection from text using aggregative linguistic features." International Conference on Next Generation Computing Technologies. Springer, Singapore, 2017, pp. 736-749. (Year: 2017).*

Shen, Jonathan, et al. "Natural tts synthesis by conditioning wavenet on mel spectrogram predictions." 2018 IEEE international conference on acoustics, speech and signal processing (ICASSP). IEEE, 2018, pp. 4479-4483. (Year: 2018).*

Jauk, Igor, et al. "Expressive speech synthesis using sentiment embeddings." Interspeech 2018: Sep. 2-6, 2018, Hyderabad. International Speech Communication Association (ISCA), 2018, pp. 3062-3066 (Year: 2018).*

Wang, Yujia, et al. "Comic-guided speech synthesis." ACM Transactions on Graphics (TOG) 38.6 (2019): pp. 1-14 (Year: 2019).*

Wu, Chuhan, et al. "Semi-supervised dimensional sentiment analysis with variational autoencoder." Knowledge-Based Systems 165 (2019): 30-39 (Year: 2019).*

\* cited by examiner

─400a

| Overall theme of paragraph 402a | Positively contributing sentences 404a | Negatively contributing sentences 406a |
|---|---|---|
| assertive /authoritative | | |
| Happy | The loan would be waived off | There will be an increase on maintenance charge |

─400b

| Overall theme of paragraph 402b | Theme of sentence 404b | Positively contributing words 406b | Negatively contributing words 408b |
|---|---|---|---|
| assertive /authoritative | | | |

FIG. 4A

METHOD, SYSTEM, AND DEVICE FOR PERFORMING REAL-TIME SENTIMENT MODULATION IN CONVERSATION SYSTEMS

TECHNICAL FIELD

This disclosure relates generally to sentiment modulation, and more particularly to method and system for performing real-time sentiment modulation in conversation systems.

BACKGROUND

Document processing may end up being a tedious and monotonous task, as documents are required to be processed, such that, text of the documents accurately reflect emotions conveyed by a creator of the document in an offline mode. Each sentence of a document may be interpreted in different ways by different individuals, thus emotions conveyed by the creator may end up being interpreted in an entirely different context. One of the conventional mechanisms used for reflecting emotions of the creator may include stressing a point by making the text of a particular statement bold. However, this conventional mechanism is not capable of stressing on a degree of boldness, which may indicate a modulation of a particular word in the sentence.

Moreover, some other conventional mechanisms reflect only static emotions for stored responses or offline communication that include text. As the static emotions are only reflected through text of the stored responses and the offline communication, the static emotions may not map with situation of a listener (or reader) or may not be adaptable to be impactful based on the listener's state of mind and emotions. Although, the creator may choose certain words that may reflect few of his emotions, however, these words may not be as impactful as intended by the creator.

Some of the conventional mechanisms may be capable of capturing emotions of the creator along with his/her voice modulation and facial emotions. But these conventional mechanisms may not be valid for stored responses and may not provide same emotions irrespective of a listener's state of mind. Moreover, such conventional mechanisms may be capable to modulate the sentiments of the sentences that include text, but the modulation done is fixed and pre-defined.

Therefore, a robust and efficient mechanism is needed for dynamic detection, modulation, and alteration of emotions in the text corresponding to a specific situation of the creator and the listener.

SUMMARY

In an embodiment, a method for automating repetitive task on a user interface is disclosed. In one embodiment, the method may include generating an impact table comprising a plurality of sentiment vectors for sentiments associated with a plurality of sentences and a plurality of emotion vectors for emotions associated with the plurality of sentences. A sentiment vector from the plurality of sentiment vectors comprises a sentiment weight assigned to each word of the associated sentence from the plurality of sentences. An emotion vector from the plurality of emotion vectors comprises an emotion weight assigned to each word of the associated sentence from the plurality of sentences. The method may further include generating for each of the plurality of sentences, a dependency vector based on the associated sentiment vector from the plurality of sentiment vectors and the associated emotion vector from the plurality of sentiment vectors. The method may further include stacking the dependency vector generated for each of the plurality of sentences to generate a waveform representing variance in sentiment and emotions across words within the plurality of sentences. The method may further include altering at least one portion of the waveform based on a desired emotional output to generate a reshaped waveform. Variance in sentiment for the at least one portion is above a predefined threshold. The method may further include generating a set of rephrased sentences for a set of sentences associated with the at least one portion, based on the reshaped waveform, the set of sentences, a user defined sentiment output.

In another embodiment, a system for automating repetitive task on a user interface is disclosed. The system includes a processor and a memory communicatively coupled to the processor, wherein the memory stores processor instructions, which, on execution, causes the processor to generate an impact table comprising a plurality of sentiment vectors for sentiments associated with a plurality of sentences and a plurality of emotion vectors for emotions associated with the plurality of sentences. A sentiment vector from the plurality of sentiment vectors comprises a sentiment weight assigned to each word of the associated sentence from the plurality of sentences. An emotion vector from the plurality of emotion vectors comprises an emotion weight assigned to each word of the associated sentence from the plurality of sentences. The processor instructions further cause the processor to generate for each of the plurality of sentences, a dependency vector based on the associated sentiment vector from the plurality of sentiment vectors and the associated emotion vector from the plurality of sentiment vectors. The processor instructions further cause the processor to stack the dependency vector generated for each of the plurality of sentences to generate a waveform representing variance in sentiment and emotions across words within the plurality of sentences. The processor instructions further cause the processor to alter at least one portion of the waveform based on a desired emotional output to generate a reshaped waveform. Variance in sentiment for the at least one portion is above a predefined threshold. The processor instructions further cause the processor to generate a set of rephrased sentences for a set of sentences associated with the at least one portion, based on the reshaped waveform, the set of sentences, a user defined sentiment output.

In yet another embodiment, a non-transitory computer-readable storage medium is disclosed. The non-transitory computer-readable storage medium has instructions stored thereon, a set of computer-executable instructions causing a computer comprising one or more processors to perform steps comprising generating an impact table comprising a plurality of sentiment vectors for sentiments associated with a plurality of sentences and a plurality of emotion vectors for emotions associated with the plurality of sentences, wherein a sentiment vector from the plurality of sentiment vectors comprises a sentiment weight assigned to each word of the associated sentence from the plurality of sentences, and wherein an emotion vector from the plurality of emotion vectors comprises an emotion weight assigned to each word of the associated sentence from the plurality of sentences; generating for each of the plurality of sentences, a dependency vector based on the associated sentiment vector from the plurality of sentiment vectors and the associated emotion vector from the plurality of sentiment vectors; stacking the dependency vector generated for each of the plurality of sentences to generate a waveform representing variance in sentiment and emotions across words within the plurality of sentences; altering at least one portion of the waveform based on a desired emotional output to generate a reshaped waveform, wherein variance in sentiment for the at least one portion is above a predefined threshold; generating a set of rephrased sentences for a set of sentences associated with the at least one portion, based on the reshaped waveform, the set of sentences, a user defined sentiment output.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 4A-4E represent performing of real-time sentiment modulation in conversation systems with reference to FIG. 3, in accordance with an exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
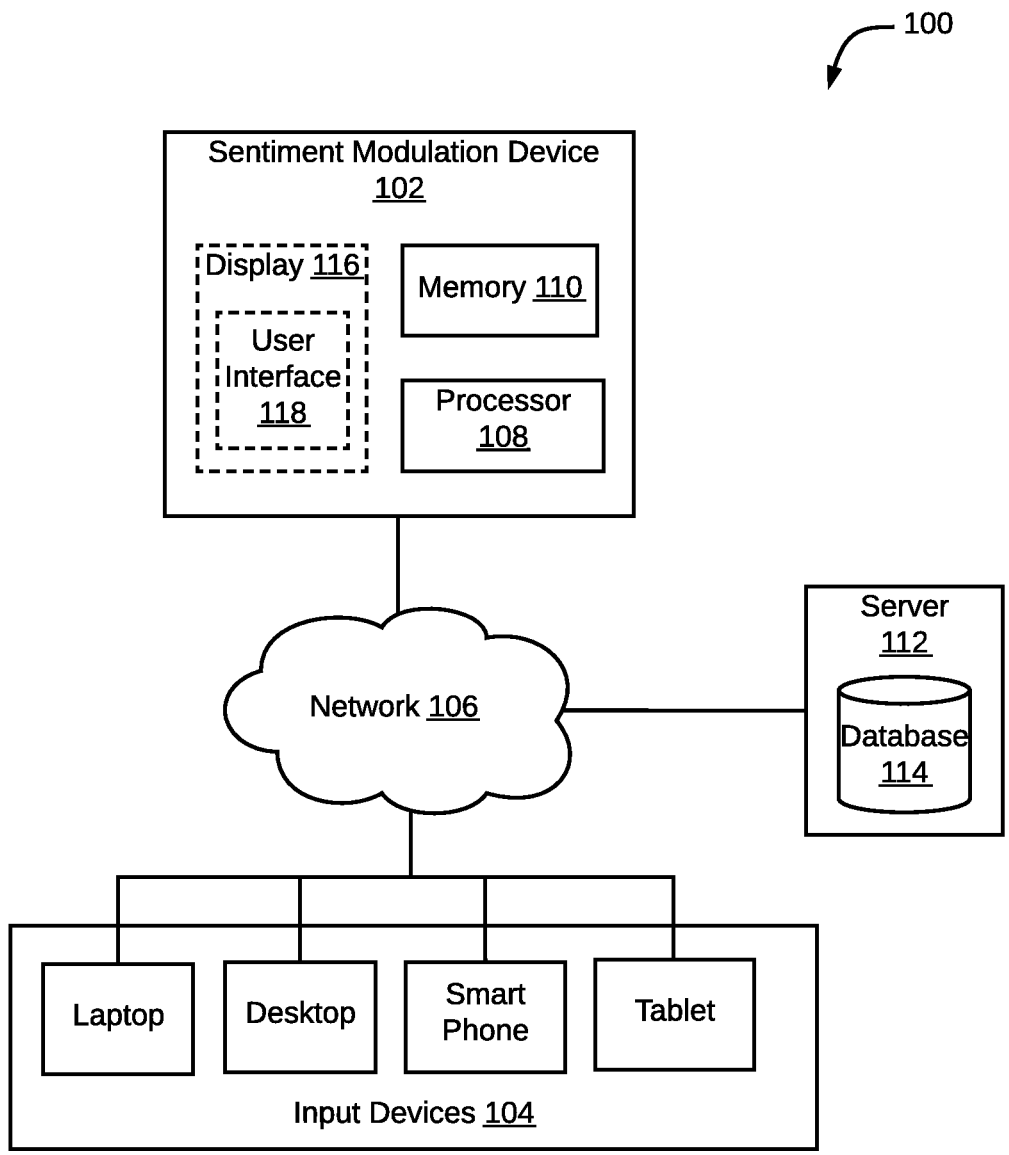
FIG. 1 is a block diagram of a system for performing real-time sentiment modulation in conversation systems, in accordance with an embodiment.

In one embodiment, a system 100 for performing real-time sentiment modulation in conversation systems is illustrated in FIG. 1. The conversation systems, for example, may include, but are not limited to chatbots, online messengers, email platforms, or voice based interactive systems. The system 100 may include a sentiment modulation device 102. The sentiment modulation device 102 may have the processing capabilities to perform real-time sentiment modulation in order to ensure effective communication between users using conversation systems. The real-time sentiment modulation may be performed by generating a set of rephrased sentences from a plurality of sentences. The plurality of sentences may be generated based on at least one multi-media content exchanged over a conversation system. The at least one multimedia content may include at least one of text, audio, simulated content, or video. By way of an example, in order to ensure effective communication, a tonal value, i.e., a degree of emotion may be changed for each the plurality of sentences to generate the set of rephrases sentences. Examples of the sentiment modulation device 102 may include, but are not limited to, a server, a desktop, a laptop, a notebook, a netbook, a tablet, a smartphone, and a mobile phone.

The sentiment modulation device 102 may receive the at least one multimedia content from input devices 104. Examples of the input devices 104 may include, but are not limited to a laptop, a desktop, a smartphone, and a tablet. The input devices 104 may be communicatively coupled to the sentiment modulation device 102, via a network 106. The network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS). Once the at least one multimedia content may be captured, the sentiment modulation device 102 may convert at least a portion of the at least one multimedia content to the plurality of sentences. Moreover, a set of words for generating the set of rephrased sentences may be extracted from a server 112 via the network 106. The server 112 may include a database 114 that may be updated periodically with a new set of words.

As will be described in greater detail in conjunction with FIG. 2 to FIG. 7, in order to perform real-time sentiment modulation in conversation systems, the sentiment modulation device 102 may include a processor 108 which may be communicatively coupled to a memory 110. The memory 110 may store processor instructions, which when executed by the processor 108 may cause the processor 108 to perform real-time sentiment modulation. This is further explained in detail in conjunction with FIG. 2. The memory 110 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random-Access Memory (DRAM), and Static Random-Access memory (SRAM).

The sentiment modulation device 102 may include a display 116 that may further include a user interface 118. A user or an administrator may interact with the sentiment modulation device 102 and vice versa through the display 116. The display 116 may be used to display an intermediate result or a final result for the real-time sentiment modulation, as performed by the sentiment modulation device 102. The user interface 118 may be used by the user to provide inputs on the intermediate results (a waveform generated corresponding to the plurality of sentences) to the sentiment modulation device 102.

Figure 2:
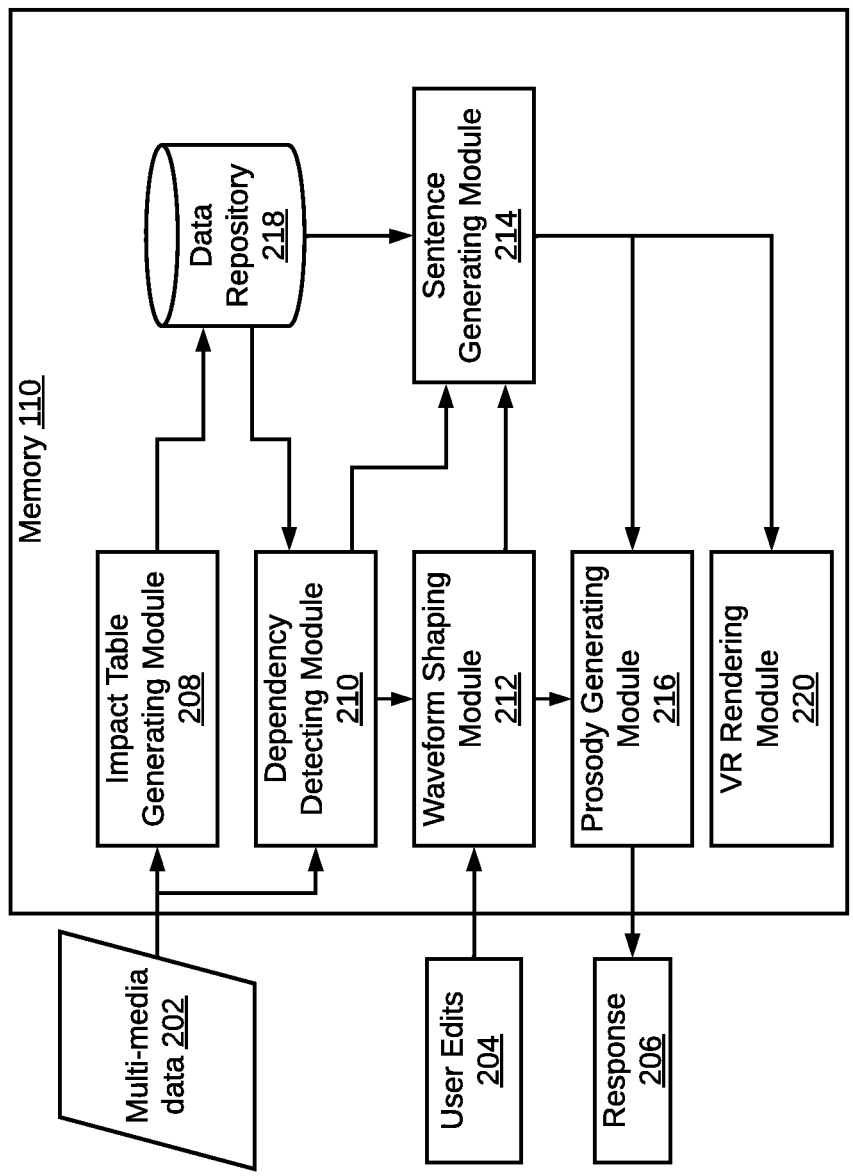
FIG. 2 illustrates a functional block diagram of various modules within a memory of a sentiment modulation device configured to perform real-time sentiment modulation in conversation systems, in accordance with an embodiment.

Referring now to FIG. 2, a functional block diagram of various modules within the memory 110 of a sentiment modulation device to perform real-time sentiment modulation in conversation systems is illustrated, in accordance with an embodiment. As explained in conjunction with FIG. 1, the sentiment modulation device 102 may perform real-time sentiment modulation by generating the set of rephrased sentences for a plurality of sentences. The memory 110 may receive a multimedia data 202 and user edits 204 as inputs and may provide a response 206 as output. The memory 110 may include modules that may perform various functions so as to perform real-time sentiment modulation. The memory 110 may include an impact table generating module 208, a dependency detecting module 210, a waveform shaping module 212, a sentence generating module 214, a prosody generating module 216, a data repository 218, and a VR rendering module 220. As will be appreciated by those skilled in the art, all such aforementioned modules 208-220 may be represented as a single module or a combination of different modules. Moreover, as will be appreciated by those skilled in the art, each of the modules 208-220 may reside, in whole or in parts, on one device or multiple devices in communication with each other.

In an embodiment, the multimedia data 202 may be captured and at least a portion of the multimedia data 202 may be converted into a plurality of sentences. In an embodiment, the multimedia data 202 may correspond to at least one portion of multi-media content exchanged over one or more conversation systems. The plurality of sentences may also be referred as text data. The text data may be fed as an input to the impact table generating module 208. In an embodiment, the text data may refer to a data whose emotional expression is to be altered based on a situation of a user or a direction received from an end user (i.e., a user request). Moreover, the user may be allowed to request for a graded emotion in the text data. By way of example, the graded emotion in the text data may correspond to change in tone that may be initially soft tone and may get harder with each sentence of a paragraph that includes the text data. Based on the change in tone, the user may be allowed to request for a reverse of emotions in the paragraph or may request for a consistent emotion throughout the paragraph.

The user edits 204 may represent editing of an emotion corresponding to the text data, by the user. Based on this, the user may be allowed to tone-up or tone-down required sentiments that needs to be reflected in the text data. Moreover, the user may tone-up or tone-down the required sentiments through right selection of words. The response 206 may include an altered text in accordance with the situation of the user or the user request. The altered text may correspond to the set of rephrased sentences. In addition, the response 206 may optionally include a prosody when the text data may be read through the conversation system. In an embodiment, the conversation system may also be referred to as a dialogue system.

The impact table generating module 208 may be configured to receive the input text data (i.e., the plurality of sentences) for generating an impact table. In an embodiment, the impact table may essentially store a plurality of sentiment vectors for sentiments associated with the plurality of sentences. The sentiment vector from the plurality of sentiment vectors may include a sentiment weight assigned to each word of the associated sentence from the plurality of sentences. It should be noted that the sentiment associated with each word may be identified by a sentiment classifier. Example of the sentiment classifier used for identifying the associated sentiment may include a Long Short-Term Memory (LSTM) sentiment classifier. The sentiment associated may be quantized to discrete level so as to represent a continuous variable value. Moreover, an output of the sentiment classifier may be maintained so as to represent a continuous variable value. In an embodiment, the sentiment associated with each word may be proportional to its relevance of the sentiment. In addition, a plurality of emotion vectors may also be identified for emotions associated with the plurality of sentences. The emotion vector from the plurality of emotion vectors may include an emotion weight assigned to each word of the associated sentence from the plurality of sentences. The sentiment vector and the emotion vector may be populated in an impact table. Thereafter, the impact table generating module 208 may be configured to store the impact table in the data repository 218.

The dependency detecting module 210 may be configured to receive the sentiment vectors and the emotion vectors from the data repository 218. The dependency detecting module 210 may receive the sentiment vectors and the emotion vectors in the form of the impact table. The impact table may provide the sentiment vectors and the emotion vectors associated with each word of the plurality of sentences. The dependency detecting module 210 may be configured to detect a dependency vector for a sentence from the plurality of sentences. The dependency vector may be generated based on emotion and sentiment dependency of each word in the sentence with at least one preceding word in the sentence and at least one preceding sentence. Moreover, the dependency vector generated for the sentence may correspond to a pile-up vector. In other words, the dependency detecting module 210 may be capable to detect an emotional dependency among each of the sentences of the text data in the conversation system in the form of the pile-up vectors. In addition, the dependency detecting module 210 may be configured to send the dependency vector to the waveform shaping module 212 and the sentence generating module 214.

The waveform shaping module 212 may be configured to receive user edits 204. In an embodiment, user edits 204 may also be referred as a user defined sentiment output. The waveform shaping module 212 may also be configured to receive the dependency vector in the form of pile-up vector from the dependency detecting module 210. In addition, the waveform shaping module 212 may be configured to generate a waveform (also referred to as an integrated waveform or a temporal waveform). The waveform may represent variance in sentiment and emotions across words within the plurality of sentences. Moreover, the waveform shaping module 212 may allow the user or the conversation system that includes the sentiment modulation device 102 to generate a reshaped waveform. The reshaped waveform may be generated by altering at least one portion of the waveform based on a desired emotional output. In other words, the waveform shaping module 212 may allow the user to alter emotional profile of each of the plurality of sentences based on the desired emotional output. By way of an example, the user may request for a particular gradation in emotion such as soft tone to harsh tone or a specific type of steady emotions in each of the plurality of sentences. Thereafter, the reshaped waveform generated for each word within each of the plurality of sentences may be sent to the sentence generating module 214. Moreover, the waveform shaping module 214 may send the reshaped waveform to the prosody generating module 216 for the modulation of a set of sentences in case of text to speech conversion.

The sentence generating module 214, may be configured to receive the reshaped waveform from the waveform shaping module 212. Moreover, the sentence generating module 214 may fetch a set of words from the data repository 218. The set of words may be used for generating a set of rephrased sentences for the set of sentences. The set of sentences may be associated with the at least one portion of the waveform for which the reshaped waveform is generated. In addition, the sentence generating module 214 may receive the pile-up vector from the dependency detecting module 210. Further, the sentence generating module 214 may be configured to record each of the plurality of sentences based on the user requirement or based on a situation of the user (or both). The plurality of sentences may be recorded so that resulting sentences (i.e., the set of rephrased sentences) may reflect an exact emotion that may be appropriate for that particular situation. Moreover, the resulting sentences (i.e., the set of rephrased sentences) may be generated based on consideration of the emotions in previous sentences (course of conversation) or a user response for that particular situation. Thereafter, the sentence generating module 214 may provide the set of rephrased sentences to the prosody generating module 216. In an embodiment, the set of rephrased sentences may correspond to reworded sentences in accordance with the situation of the user or a user defined sentiment output.

The prosody generating module 216 may be configured to receive the reshaped waveform from the waveform generating module 212. In addition, the prosody generating module 216 may be configured to receive the set of rephrased sentences from the sentence generating module 214. Moreover, the prosody generating module 216 may also be configured to generate a prosody and blends the set of rephrased sentences with remaining plurality of sentences based on the reshaped waveform. The generated prosody may be rendered to the user. In other words, the prosody generating module 216 may provide a modulation or a stress to each word in the set of sentences. The modulation or the stress may be done in a way such that the modulation on each word may be effective to the user at a time of text to speech conversions. Moreover, the modulation may be done by the prosody generating module 216 when the end user is interacting with the conversation system or a chat bot application. Thereafter, the generated prosody may be rendered to the user as the response 206.

The data repository 218 may receive the generated impact table from the impact table generating module 208. The data repository 218 may then store the generated impact table. Moreover, the impact table stored in the data repository 218 may be extracted by the dependency detecting module 210. In addition, the impact table stored in the data repository 218 may also be extracted by the sentence generating module 214. In an embodiment, the data repository 218 may act as a storage space for tables, such as, the impact table, a dictionary/vocabulary, and the intermediate result. It should be noted that the data repository 218 may be required to be very fast in order to support and enable real-time conversations.

The VR rendering module 220 may receive an input data that includes the set of rephrased sentences, the remaining plurality of sentences, and the reshaped waveform from the sentence generating module 214. On receiving the input data, the VR rendering module 220 may generate facial expressions for at least one virtual avatar in the conversation system. The facial expressions may be generated for the set of rephrased sentences and the remaining plurality of sentences based on the reshaped waveform. Thereafter, the facial expressions generated for the at least one virtual avatar may be rendered by the VR rendering module 220 to an end user.

Figure 3:
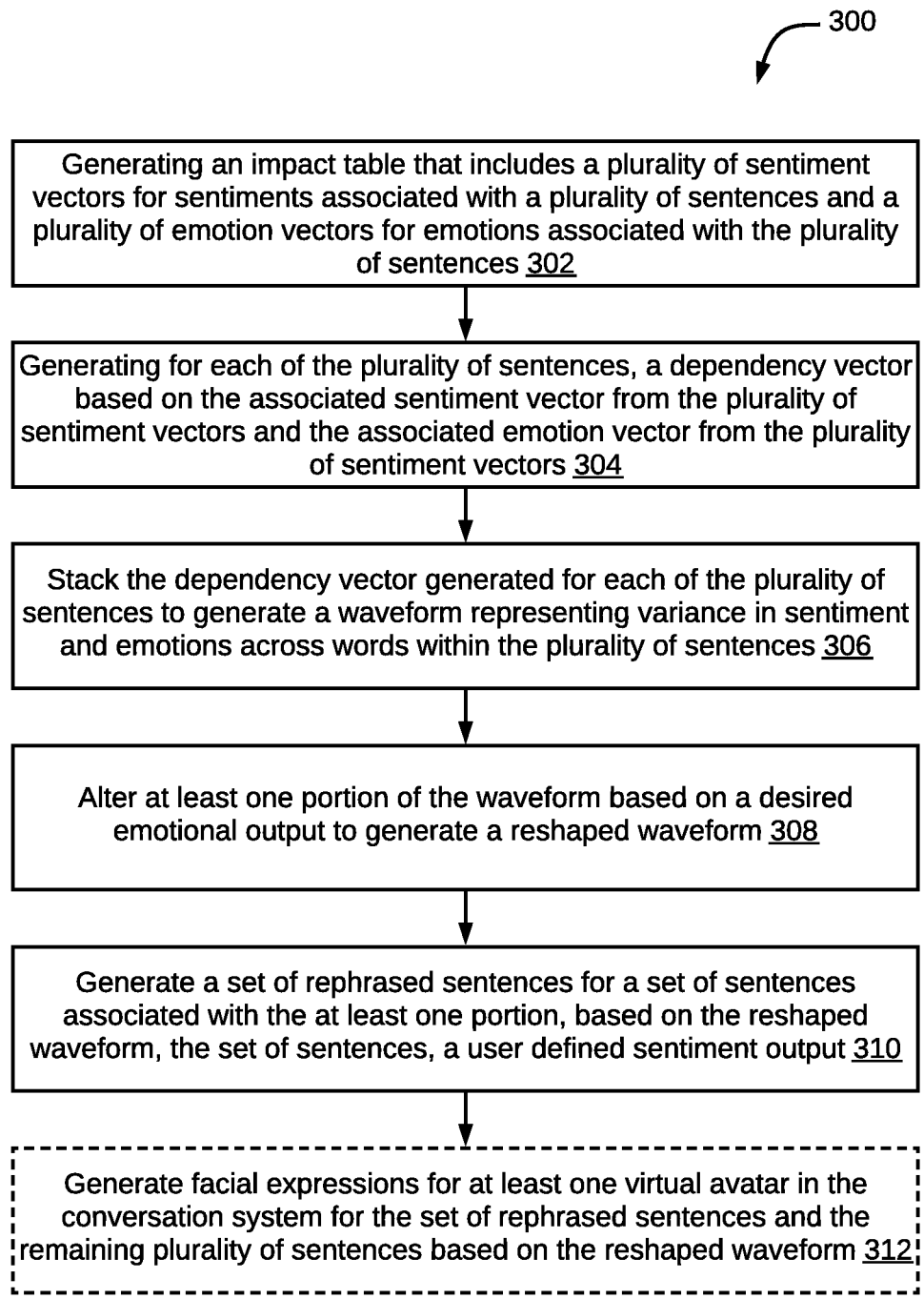
FIG. 3 illustrates a flowchart of a method for performing real-time sentiment modulation in conversation systems, in accordance with an embodiment.

Referring now to FIG. 3, a flowchart of a method for performing real-time sentiment modulation in conversation systems is illustrated, in accordance with an embodiment. At step 302, an impact table is generated. The impact table may include a plurality of sentiment vectors for sentiments associated with a plurality of sentences. In addition, the impact table may include a plurality of emotion vectors for emotions associated with the plurality of sentences. In an embodiment, a sentiment vector from the plurality of sentiment vectors may include the sentiment weight assigned to each word of that sentence. Similarly, an emotion vector from the plurality of emotion vectors may include the emotion weight assigned to each word of that sentence. It should be noted that the sentiments may represent an overall impression monitored over a period of time of the user that may be applied over the plurality of sentences. The plurality of sentences may correspond to the paragraph that includes the text data. Based on the overall impressions, the sentiments associated with the plurality of sentences, for example, may be categorized as very good, good, neutral, bad, and very bad. On other hand, the emotions may correspond to an expression of the user and may be instantaneous. Examples of the expression of the user may include, but is not limited to facial expressions, choice of words, and raised voice. Based on the expressions, the emotions corresponding to the plurality of sentences, for example, may be categorized as happy, sad, angry, disgust, and fear.

Additionally, the plurality of sentiment vectors and the plurality of emotion vectors used for generating the impact table may incorporate the plurality of attributes. The plurality of attributes include at least one of facial expressions of a user involved in the conversation system, voice pitch and modulation of the user, or text characteristics. It should be noted that the plurality of sentences may be generated by converting at least a portion of the at least one multimedia content to the plurality of sentences. Moreover, the at least one multimedia content may be captured from a data exchanged over a conversation system. The at least one multimedia content may include at least one of text, audio, simulated content, or video. In an embodiment, the at least one multimedia content may correspond to a pre-stored response in the conversation system. In another embodiment, the at least one multimedia content may correspond to a text that may be generated by the user in real-time. The text generated in the real-time time may correspond to the text for which the user wants to reward and impart the emotions. Examples of the text generated in the real-time may include, but are not limited to, an electronic mail and a chat.

In an embodiment, initially the sentiments associated with each sentence of the paragraph may be identified. Once the associated sentiment is identified, the associated sentiment may be stored in the impact table. It should be noted that the impact table may also store the emotions associated with each sentence of the paragraph. In addition, the impact table may store the emotions associated with each word of each of the sentence of the paragraph. The FIG. 4A represents a table 400a depicting the impact table that includes the sentiments associated with the plurality of sentences. In addition, the FIG. 4A also depicts a table 400b representing the impact table that includes the emotions associated with the plurality of sentences. The table 400a includes columns that represent an overall theme of paragraph 402a, positively contributing sentences 404a, and negatively contributing sentences 406a. By way of an example, based on analysis of the text data in the paragraph, the sentiment associated with the paragraph may be determined as "happy." Thereafter, the sentiment associated may be represented in a column, i.e., the overall theme of the paragraph 402a of the table 400a. Moreover, a set of sentences from the plurality of sentences may be positively contributing towards the sentiments associated with the paragraph. In addition, a set of sentences from the plurality of sentences may be negatively contributing towards the sentiments associated with the paragraph. The set of sentences that may be positively contributing may be represented in the column 404a of the table 400a. Similarly, the set of sentences that may be negatively contributing may be represented in the column 406a of the table 400a.

Similarly, the table 400b may be generated based on the emotions associated with each word in each sentence of the paragraph that includes the text data. The table 400b includes columns that represent an overall theme of the paragraph 402b, theme of a sentence 404b, positively contributing words 406b, and negatively contributing words 408b. A column that includes the overall theme of paragraph 402b may represent the emotions associated with the paragraph as a whole. A column that includes the theme of sentence 404b may represent the emotions associated with each sentence of the paragraph. A column that includes the positively contributing words 406b may represent a set of words from each sentence of the set of sentences that may be positively contributing towards the emotions given in the theme of sentence 404b. A column that includes the negatively contributing words 408b may represent a set of words from each sentence of the set of sentences that may be negatively contributing towards the emotions associated with each of the sentence.

In an embodiment, the text of the paragraph may be converted to a waveform that, for example, may be represented as (−1, 0, 1), which corresponds to words in each sentence of the paragraph. In an embodiment, the waveform may be derived based on a relevance associated with each word towards a particular emotion. The relevance towards the particular emotion may be determined as indicated in an emotion classifier. The emotion classified may correspond to an LSTM emotion classifier. It should be noted that, the emotion classifier may be a part of the impact table generating module 208. In another embodiment, an activation value may be used to generate the waveform instead of the associated relevance. Moreover, the degree of stress or the modulation of each word may depend on the relevance associated with each word. By way of an example, consider a sentence "This is not acceptable." The waveform generated for this sentence may be represented as (0, 0, −0.8, −0.6). From the waveform it may be identified that the terms "this" and "is" may not be contributing towards the associated sentiment. However, when the theme of sentence may be stressing on the term "this," then the waveform generated for the sentence may be represented as [1.1, 0, 1.2, 0.6]. Therefore, the sentence "This is not acceptable" may be represented as "This is not acceptable." In addition, the degree of stressing or the modulation may be controlled as per the user requirement.

Figure 4B:
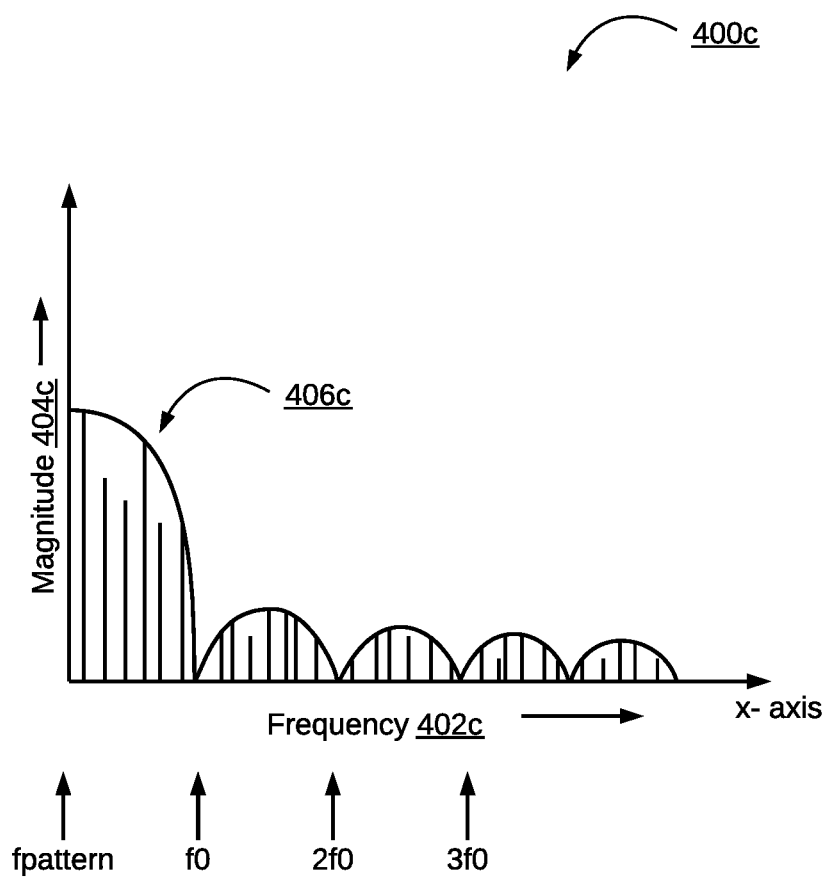

An exemplary waveform is represented by way of FIG. 4B. A graph 400c in the FIG. 4B represents the waveform generated corresponding to the plurality of sentences. The graph 400c depicts a frequency 402c on its x-axis (also depicting frequencies fpattern, f0, 2f0, and 3f0) and a magnitude 404c on its y-axis. Based on the frequency 402c and the magnitude 404c, at least one portion of the waveform that is required to be altered may be determined. The at least one portion of the waveform may be determined, when the magnitude 404c corresponding to the at least one portion of the waveform is beyond a predefined threshold. Then for that portion (the at least one portion) of the waveform the reshaped waveform may be generated. By way of an example, the identified at least one portion may be indicated by 406c.

Figure 4C:
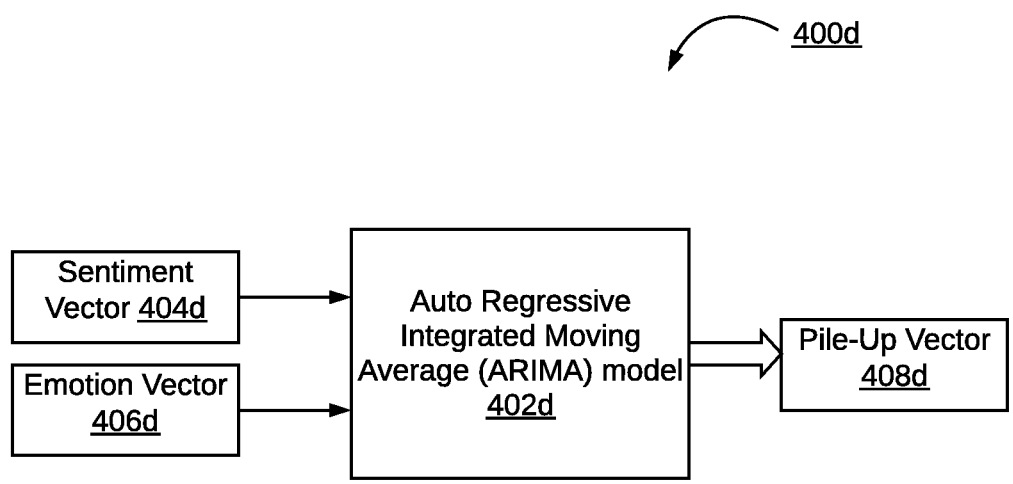

At step 304, the dependency vector may be generated for each of the plurality of sentences based on the associated sentiment vectors from the plurality of sentiment vectors and the associated emotion vectors from the plurality of emotion vectors. The dependency vector for the sentence from the plurality of sentences may corresponds to emotion and sentiment dependency of each word in the sentence with at least one preceding word in the sentence and at least one preceding sentence in the paragraph. The dependency vector may also be referred to as a pile-up vector. The pile-up vector may be generated via an Auto Regressive Integrated Moving Average (ARIMA) model. The ARIMA model may also be used to generate an integrated value for several previous sentences. In an embodiment, the plurality of sentences may also be referred as the paragraph that includes the text data. An exemplary ARIMA model 402d is depicted in FIG. 4C. An ARIMA model 402d may receive a sentiment vector 404d and an emotion vector 406d as an input. The sentiment vector 404d may correspond to the plurality of sentiment vectors for sentiments associated with the plurality of sentences. Similarly, the emotion vector 406d may correspond to the plurality of emotion vectors for emotions associated with the plurality of sentences. Based on receiving of the sentiment vector 404d and the emotion vector 406d, the ARIMA model 402d may generate a pile-up vector 408d. By way of an example, the sentiment vector 404d sampled at time instant 'n' may be represented as 'S[n]', the emotion vector 406d sampled at time instant 'n' may be represented as 'E[n]'. In this case, the pile-up vector 408d sampled at time instant 'n' (represented as P[n]) may be generated by the ARIMA model 402d based on an equation (1) represented below:

$$P[n]=a_0(S[n]-S[n-1])+b_0(E[n]-E[n-1])+c_0(P[n-1]-P[n-2])\ldots \quad (1)$$

where, $a_0$, $b_0$, and $c_0$ represents model parameters.

At step 306, dependency vectors generated for each of the plurality of sentences may be stacked. The dependency vectors may be stacked in order to generate the waveform. The waveform (also referred as a temporal waveform) may represent variance in sentiment and emotions across words within the plurality of sentences. In an embodiment, on receiving the plurality of sentences, a set of words captured from the plurality of sentences and a speech domain corresponding to the set of words may be modulated. The speech domains may include, but is not limited to the modulation, the emotions, and the authoritative voice. The set of words and the speech domain may be modulated based on the waveform selected by the user or a context associated with the plurality of sentences. By way of an example, the context may be identified based on a repeated question asked by the user. A set of words used by the user for asking the questions may be altered based on a synonym provided for each word in the set of words to the user. Moreover, the synonym provided may represent a change in emotion or a change of voice tone of the user.

In other words, a harsh tone of the text data may be made softer or pleasing to the user. In addition, each of a negative word in the text data may be replaced with a positive word. The negative words may be replaced in such a way that meaning of other sentences may not be altered in the paragraph. Moreover, an antonym may be used to replace each of the negative word without altering the meaning of the sentence. By way of an example, a sentence "if you don't pay back loans, you'll be behind the bars" may be reworded as "it is good to pay loan not to be behind bars". It should be noted that, a word used for rewording may be selected from historical data, a real-time transcription, or a contact center agent response (e.g., for repeated questions). In an embodiment, a reinforcement learning model (also referred as an Artificial Intelligence model) may be used for rewording the set of sentences. The reinforcement learning model may adaptively learn a change in words (i.e., the reworded words). Based on learning, the reinforcement learning model may start predicting a requirement for the changes in words, i.e., the set of words that needs to be replaced. Thereafter, the reinforcement learning model may compare the change in words with a validation data. The comparison may be done in order to fine-tune the change in words corresponding to the text. In addition, the change in words may be fine tune in order to provide weightage to deviation of difference with a reference goal. In other words, a penalty may be more, when an absolute value of deviation is more.

At step 308, the at least one portion of the waveform generated may be altered. The at least one portion of the waveform may be altered based on the desired emotional output in order to generate the reshaped waveform. The reshaped waveform may be generated for the at least one portion of the waveform when the variance of the sentiment for the at least one portion is above a predefined variance threshold. In addition, the at least one portion of the waveform may be converted to the plurality of sentences. In an embodiment, the waveform generated for the plurality of sentences may be edited by the user based on the emotions of the users. The emotions of the user may correspond to the desired emotional output. By way of an example, an email or an instant message that may be ready for dispatch may be altered by the user. The user may alter the email of the instant message in way such that the email or the instant message may strongly reflect the emotions of the user. Moreover, the plurality of sentences may be reworded in accordance with the waveform that the user may want to edit. In another embodiment, the plurality of sentences may be edited by the conversation system based on the emotion of a listener. Thereafter, the plurality of sentences altered by the conversation system may be rendered to the listener. By way of an example, the conversation system may alter a stored email, or a stored instant message based on the emotions of the listener.

In an embodiment, an analysis may be performed for the waveform representing the variance of the sentiments and the emotions across words within the plurality of sentences. The analysis may be performed in order to generate the reshaped waveform corresponding to each of the sentiment associated with each of the plurality of sentences. It should be noted that, a spectrum of the waveform may be considered for fixed number of sample words (e.g., 256 words). Additionally, when the emotions of user remain stable, then a bandwidth of the spectrum may shrink. Alternatively, when the emotions of user fluctuate, then the bandwidth of the spectrum may expand. Based on mapping of a change in bandwidth (considered as a quantifying parameter), words corresponding to the plurality of sentences may be selected accordingly. Moreover, the user may change the waveform by editing the relevance corresponding to each of the plurality of sentences. In addition, the user may specify the graded emotion or the consistent emotion with the plurality of sentences based on the desired emotional output.

At step 310, the set of rephrased sentences may be generated from the set of sentences. The set of sentences may be associated with the at least one portion of the waveform for which the reshaped waveform may be generated. In addition, the set of rephrased sentences may be generated based on the reshaped waveform, the set of sentences, and the user defined sentiment output. The set of rephrased sentences may be generated by the AI model. The AI model may correspond to the LSTM model with feedback. In an embodiment, the AI model may be trained based on a set of original sentences along with the antonyms. The trained AI model may take as an input the set of sentences and the reshaped waveform in order to generate the set of rephrased sentences. The set of rephrased sentences may include rewording and the change in tone of each sentence in the set of rephrased sentences. Moreover, the user may provide the user defined sentiment output that the user wants to be reflected in the set of rephrased sentences. In an embodiment, a set of new words may be generated by generating the set of rephrased sentences based on the user defined sentiment output. In addition, the set of rephrased sentences generated may be reconsidered as the feedback for further refining the set of rephrased sentences.

Figure 4D:
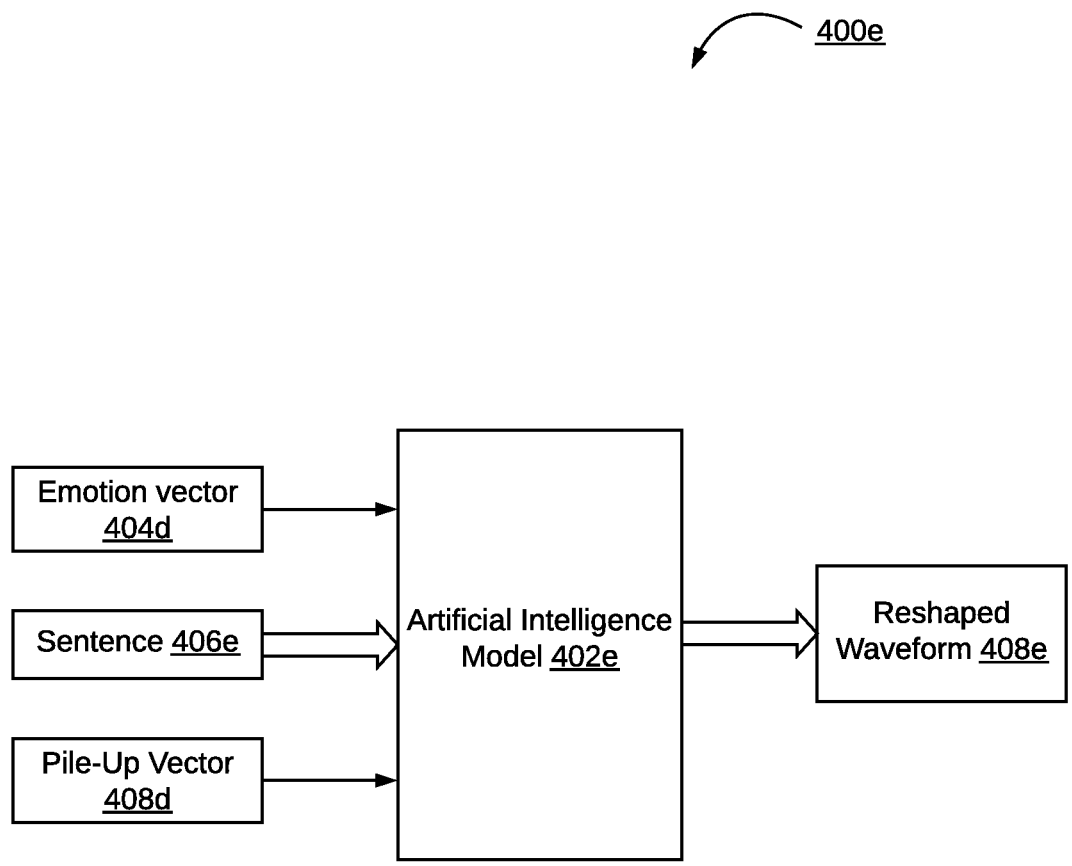
Figure 4E:
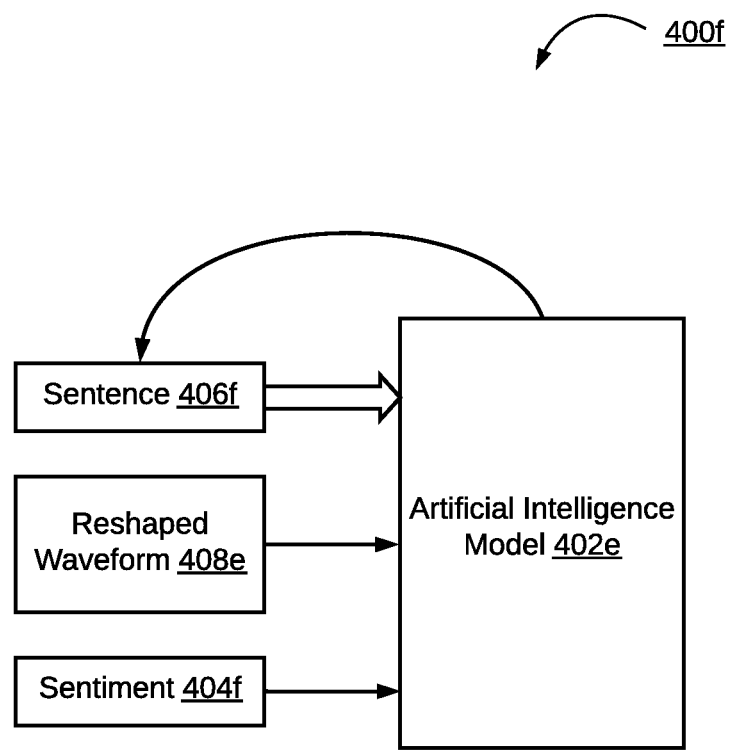

By way of an exemplary embodiment for steps 308 and 310, an Artificial Intelligence (AI) model that may be used to generate the reshaped waveform is depicted in FIG. 4D, that includes an AI model 402e, which for examples may be an LSTM model. The AI model 402e may receive the emotion vector 404d, the pile-up vector 408d, and a sentence 406e. On receiving the emotion vector 404d, the pile-up vector 408d, and the sentence 406e, the AI model 402e may generate a reshaped waveform 408e corresponding to the sentence 406e. Further, FIG. 4E depicts generation of rephrased sentence by the AI model 402e, which may receive a sentiment 404f, a sentence 406f, and the reshaped waveform 408e. The sentiment 404f may correspond to the user defined sentiment output. The sentence 406f may correspond to the set of sentences. Based on receiving the sentiment 404f, the sentence 406f, and the reshaped waveform 408e, the AI model 402e may generate the set of rephrased sentences. The set of rephrased sentences may further be used as a feedback for further refining the set of rephrased sentences. By way of an example, consider a sentence "If you do not pay loan you will be jailed" with a waveform represented as (0, 0, −0.2, −0.3, −0.4, 0.1, 0, 0, 0, −1.1). The user may request for a down tone of the emotion corresponding to the sentence. Based on the user request, a rephrased sentence may be generated for the sentence. The rephrased sentence may be represented as "Pay loan to avoid jail" with an associated waveform represented as (0, 0, 0.9, 0.3, 0.1).

In an embodiment, at step 312, facial expressions for at least one virtual avatar may be generated in the conversation system for the set of rephrased sentences and the remaining plurality of sentences. The virtual avatar may be based on the reshaped waveform.

Figure 5:
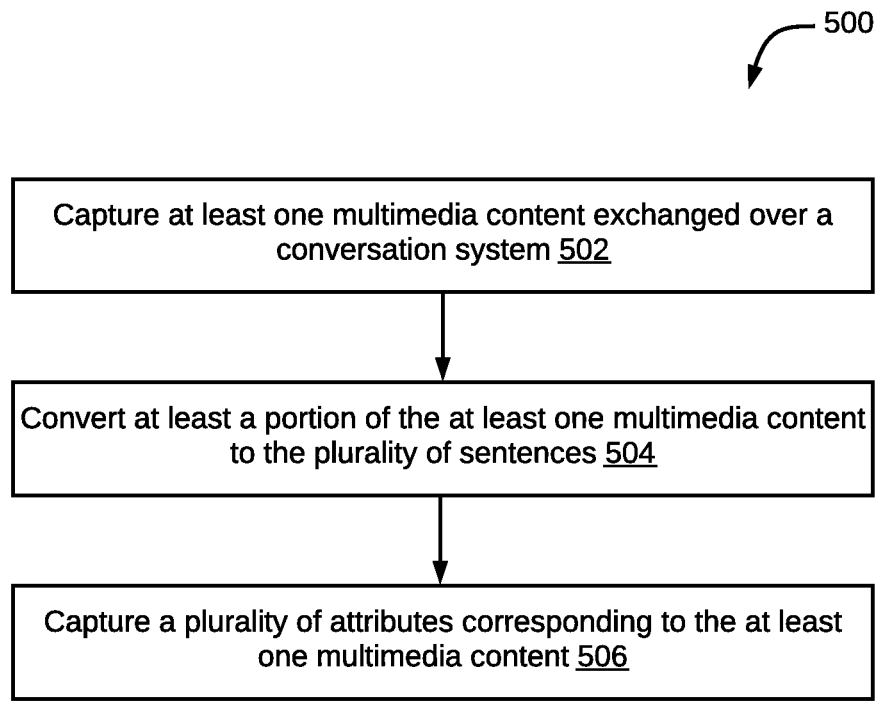
FIG. 5 illustrates a flowchart of a method for capturing a plurality of attributes from at least one multimedia content exchanged over a conversation system, in accordance with an embodiment.

Referring now to FIG. 5, a flowchart of a method for capturing a plurality of attributes from at least one multi-media content exchanged over a conversation system is illustrated, in accordance with an embodiment. At step 502, the at least one multi-media content may be captured that may be exchanged over the conversation system. The at least one multimedia content may include, but is not limited to, at least one of text, audio, simulated content, or video. At step 504, at least the portion of the at least one multi-media content may be converted into the plurality of sentences. In an embodiment, the plurality of sentences may correspond to the paragraph comprising the text data. At step 506, a plurality of attributes may be captured corresponding to the at least one multimedia content. The plurality of attributes may include, but are not limited to, at least one of facial expressions of a user involved in the conversation system, voice pitch and modulation of the user, or text characteristics. This has already been explained in detail in conjunction with FIG. 2 and FIG. 3.

Figure 6:
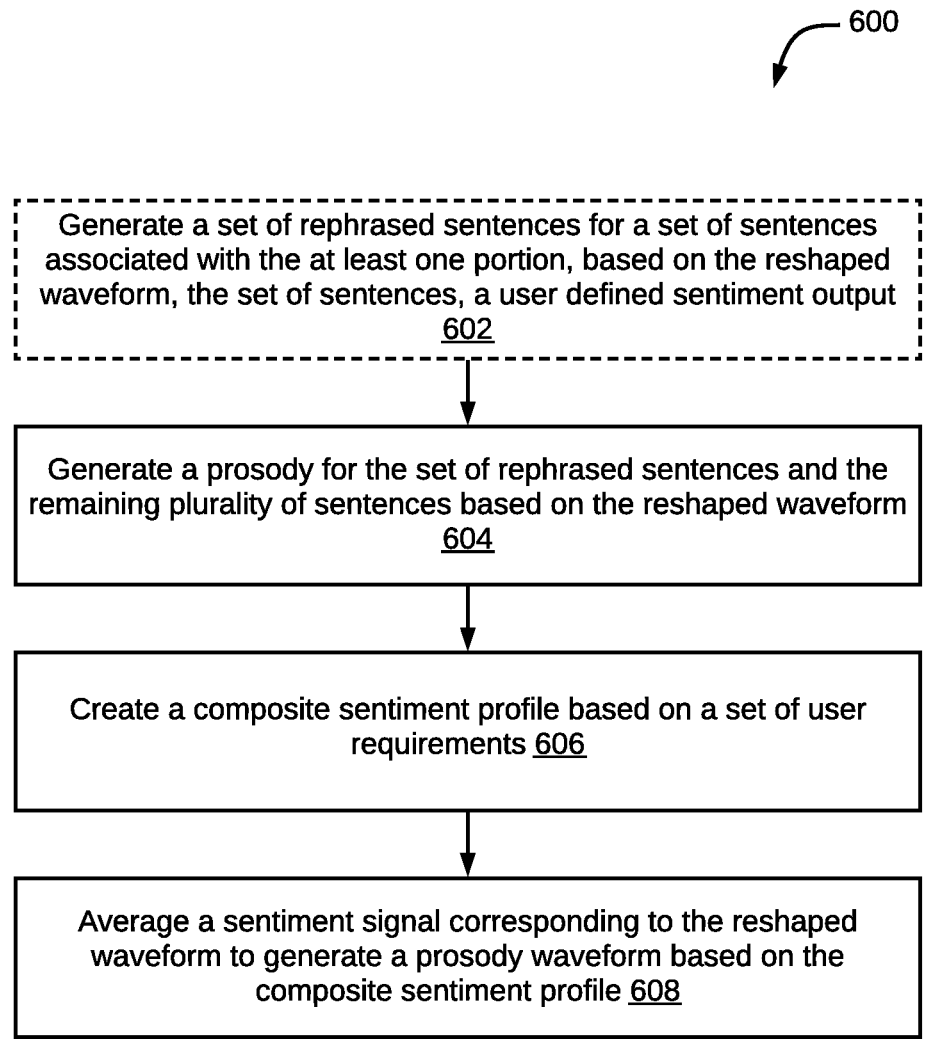
FIG. 6 illustrates a flowchart of a method for generating a prosody waveform based on a composite sentiment profile corresponding to a set of user requirement, in accordance with an embodiment.

Referring now to FIG. 6, a flowchart of a method for generating a prosody waveform based on a composite sentiment profile corresponding to a set of user requirement is illustrated, in accordance with an embodiment. In reference to FIG. 6, at step 602, the set of rephrased sentences may be generated for the set of sentences. The set of sentences may correspond to the at least one portion of the waveform for which the reshaped waveform may be generated. In addition, the set of rephrased sentences may be generated based on the reshaped waveform, the set of sentences, and the user defined sentiment outputs. At step 604, prosody may be generated for the set of rephrased sentences and the remaining plurality of sentences. The prosody may be generated based on the reshaped waveform. At step 606, a composite sentiment profile may be created based on a set of user requirement. The composite sentiment profile may provide a technique for stressing different words in the plurality of sentences. Also, the composite sentiment profile may provide a technique for modulating each word in the plurality of sentences. The modulation may correspond to a variety of speech. Examples of variety of speech may include, but are not limited to, soft spoken, authoritative, angry tone, happy, and sad. In addition, words that needs to be stressed and the degree of stress may be specified by the user based on sentiments and emotions across words within the plurality of sentences. By way of an example, while drafting an email or any content on social media, the degree of stress may be specified by the user. Moreover, the degree of stress may be specified corresponding to other words present within the plurality of sentences of the email or the social media content. In addition, the user may define modulation (such as soft spoken, authoritative, angry tone, happy, sad) as per requirement.

At step 608, a sentiment signal may be averaged corresponding to the reshaped waveform. The sentiment signal is averaged to generate a prosody waveform based on the composite sentiment profile. Thereafter, the prosody waveform generated may be transposed into the prosody. Moreover, when the sentiment signal may be averaged, a bipolar signal may turn into an analog signal. In one embodiment, a weighted addition may be associated with weight based on a user discretion and choice. It should be noted that, the prosody waveform may be generated during text to speech conversions. The words in the plurality of sentences may be modulated based on the sentiment signal averaged.

As an example application of the method and system explained above, consider a scenario where a user "John" works in a company as a manager. John may want to send an email to other subordinates working in the company. For this, John may write the email that includes his thoughts in a document. By using the proposed invention, John may upload the document in a system that includes the semantic modulation device 102. Based on the proposed invention, the system may generate the impact table indicating an impact of each word in the document. Moreover, the system may generate the impact table considering each of a set of statements in the document. Thereafter, John may alter a graph to tone down certain harsh words reflecting his sentiments. In addition, John may stress on certain words in the document related to discipline. Based on this, the system may generate a set of rephrased sentences corresponding to the set of statements in the document. Thereafter, John may use the document with the set of rephrased sentences for sending the email to other subordinates.

By way of another example, a user "John" wants to know about a loan policy of a bank. For this, John makes a call to a contact center of a bank. A conversation system implementing the proposed invention, provides response to John for his queries. The conversation system provides him with the response for his queries related to the loan policy. Based on the response, John starts getting uncomfortable and agitated with an Equated Monthly Installments (EMI) and interest rates. The conversation system becomes evident about John's behavior due to his raised voice and choice of words in queries. Based on the behavior of John, the conversation system subsequently starts rewording (also referred as rephrasing) the response in order to calm John. By way of an example, for a query "what happen if I do not pay back loan in time" a stored response in the conversation system may correspond to "the bank would sell your property and recover the money". However, based on monitoring of the John's behavior, the conversation system may reword the stored response for the query "what happen if I do not pay back loan in time". The reworded response may include "the bank would use mortgaged property to make up for money. This reworded response generated by the conversation system may sound less offending to John and may thus help in keeping him calm.

Figure 7:
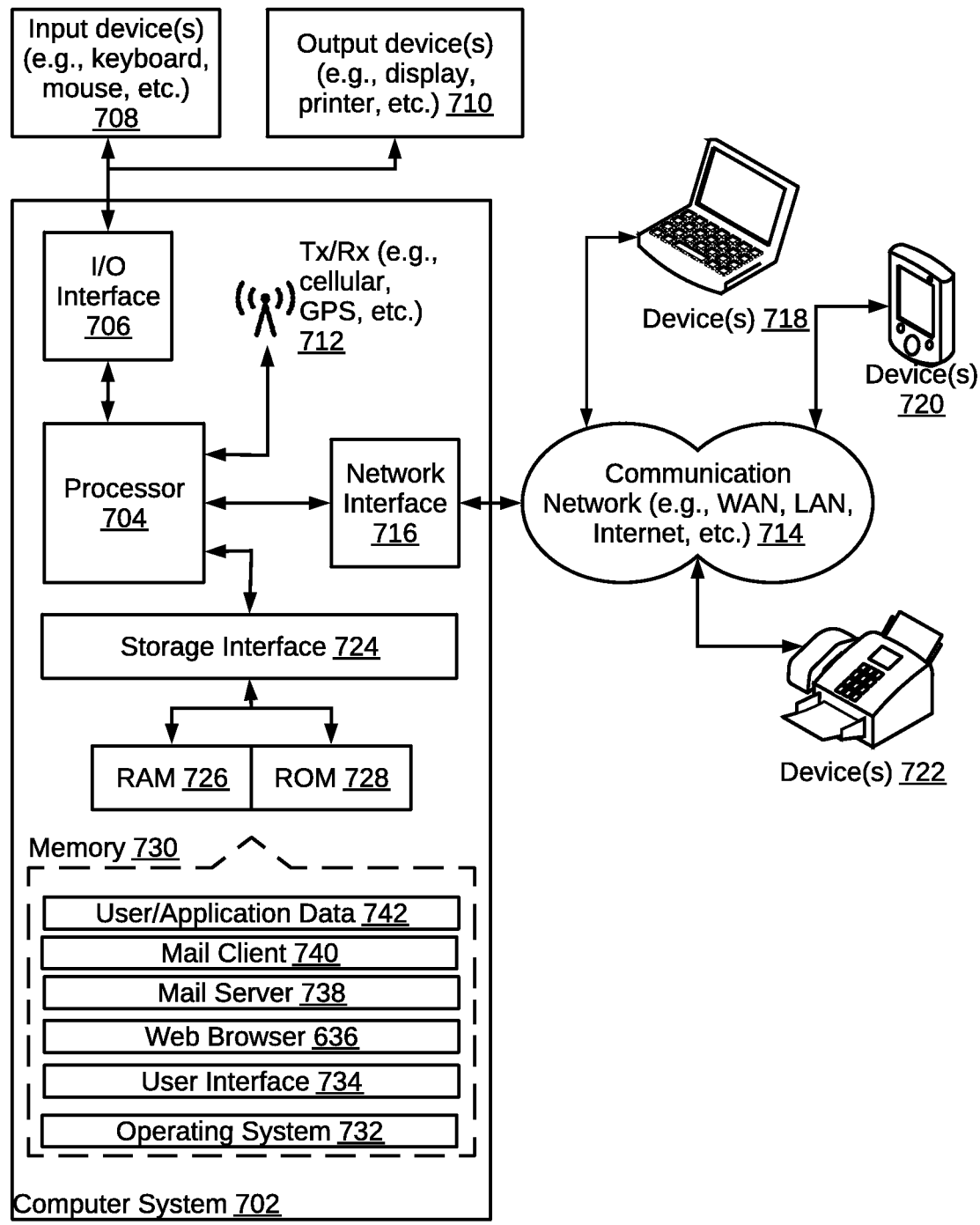
FIG. 7 illustrates a block diagram of an exemplary computer system for implementing embodiments consistent with the present disclosure.

Referring now to FIG. 7, a block diagram of an exemplary computer system 702 for implementing various embodiments is illustrated. Computer system 702 may include a central processing unit ("CPU" or "processor") 704. Processor 704 may include at least one data processor for executing program components for executing user or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLOM® microprocessor, DURON® microprocessor OR OPTERON® microprocessor ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (for example, using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (for example, RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 636, mail server 738, mail client 740, user/application data 742 (for example, any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 636 stored program component. Web browser 636 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for performing real-time sentiment modulation in conversation systems. The method and system may first generate an impact table that includes a plurality of sentiment vectors for sentiments associated with a plurality of sentences and a plurality of emotion vectors for emotions associated with the plurality of sentences. The method and system may then generate a dependency vector for each of the plurality of sentences based on the associated sentiment vector from the plurality of sentiment vectors and the associated emotion vector from the plurality of emotion vectors. Further, the method may stack the dependency vector generated for each of the plurality of sentences to generate a waveform representing variance in sentiment and emotions across words within the plurality of sentences. Thereafter, the method and system may alter at least one portion of the waveform based on a desired emotional output to generate a reshaped waveform. Additionally, the method and the system may generate a set of rephrased sentences for a set of sentences associated with the at least one portion, based on the reshaped waveform, the set of sentences, a user defined sentiment output.

The benefit of the invention is that, the present invention may reduce a need of storing all possible responses with different emotions. The present invention may also dynamically determine a degree of modulation based on user response to text or voice derived from text. Therefore, the present invention may effectively communicate emotions of an individual to another individual. Moreover, the present invention may support dynamic rewording of the text in order to ensure that another individual may receive the text with right sense of emotions of the individual.

The specification has described method and system for performing real-time sentiment modulation in conversation systems. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for performing real-time sentiment modulation in a conversation system, the method comprising:
   generating, by a sentiment modulation device via an Artificial Intelligence (AI) model, an impact table comprising a plurality of sentiment vectors for sentiments associated with a plurality of sentences and a plurality of emotion vectors for emotions associated with the plurality of sentences, wherein a sentiment vector from the plurality of sentiment vectors comprises a sentiment weight assigned to each word of an associated sentence from the plurality of sentences, and wherein an emotion vector from the plurality of emotion vectors comprises an emotion weight assigned to each word of the associated sentence from the plurality of sentences;
   generating, by the sentiment modulation device, for each of the plurality of sentences, a dependency vector based on the associated sentiment vector from the plurality of sentiment vectors and the associated emotion vector from the plurality of emotion vectors;
   stacking, by the sentiment modulation device, the dependency vector generated for each of the plurality of sentences to generate a waveform representing variance in sentiment and emotions across words within the plurality of sentences;
   altering, by the sentiment modulation device via the AI model, at least one portion of the waveform based on a desired emotional output to generate a reshaped waveform, wherein variance in sentiment for the at least one portion is above a predefined threshold;
   generating, by the sentiment modulation device, a set of rephrased sentences for a set of sentences associated with the at least one portion, based on the reshaped waveform, the set of sentences, and a user defined sentiment output; and
   generating, by the sentiment modulation device, a prosody for the set of rephrased sentences and a remaining plurality of sentences based on the reshaped waveform, wherein generating the prosody comprises:
      creating a composite sentiment profile based on a set of user requirements; and
      averaging a sentiment signal corresponding to the reshaped waveform to generate a prosody waveform based on the composite sentiment profile, wherein the prosody waveform is transposed into the prosody.

2. The method of claim 1, further comprising:
capturing at least one multimedia content exchanged over the conversation system, wherein the at least one multimedia content comprises at least one of text, audio, simulated content, or video; and converting at least a portion of the at least one multimedia content to the plurality of sentences.

3. The method of claim 2, further comprising capturing a plurality of attributes corresponding to the at least one multimedia content, wherein the plurality of attributes comprises at least one of facial expressions of a user involved in the conversation system, voice pitch and modulation of the user, or text characteristics.

4. The method of claim 3, wherein the plurality of sentiment vectors and the plurality of emotion vectors incorporate the plurality of attributes.

5. The method of claim 1, wherein the dependency vector for a sentence from the plurality of sentences corresponds to emotion and sentiment dependency of each word in the sentence with at least one preceding word in the sentence and at least one preceding sentence, and wherein the dependency vector is a pile-up vector for a sentiment vector and an emotion vector generated for the sentence.

6. The method of claim 5, wherein the dependency vector is generated based on an Auto Regressive Integrated Moving Average (ARIMA) model.

7. The method of claim 1, wherein the prosody waveform is generated during text to speech conversion.

8. The method of claim 1, further comprising generating facial expressions for at least one virtual avatar in the conversation system for the set of rephrased sentences and a remaining plurality of sentences based on the reshaped waveform.

9. A system for performing real-time sentiment modulation in a conversation system, the system comprising:
a processor; and
a memory communicatively coupled to the processor, wherein the memory stores processor instructions, which, on execution, cause the processor to:
generate an impact table comprising a plurality of sentiment vectors for sentiments associated with a plurality of sentences and a plurality of emotion vectors for emotions associated with the plurality of sentences, wherein a sentiment vector from the plurality of sentiment vectors comprises a sentiment weight assigned to each word of an associated sentence from the plurality of sentences, and wherein an emotion vector from the plurality of emotion vectors comprises an emotion weight assigned to each word of the associated sentence from the plurality of sentences;
generate for each of the plurality of sentences, a dependency vector based on the associated sentiment vector from the plurality of sentiment vectors and the associated emotion vector from the plurality of emotion vectors;
stack the dependency vector generated for each of the plurality of sentences to generate a waveform representing variance in sentiment and emotions across words within the plurality of sentences;
alter at least one portion of the waveform based on a desired emotional output to generate a reshaped waveform, wherein variance in sentiment for the at least one portion is above a predefined threshold;
generate a set of rephrased sentences for a set of sentences associated with the at least one portion, based on the reshaped waveform, the set of sentences, and a user defined sentiment output; and generate a prosody for the set of rephrased sentences and a remaining plurality of sentences based on the reshaped waveform, wherein generating the prosody comprises:
creating a composite sentiment profile based on a set of user requirements; and
averaging a sentiment signal corresponding to the reshaped waveform to generate a prosody waveform based on the composite sentiment profile, wherein the prosody waveform is transposed into the prosody.

10. The system of claim 9, wherein the processor instructions further cause the processor to:
capture at least one multimedia content exchanged over the conversation system, wherein the at least one multimedia content comprises at least one of text, audio, simulated content, or video; and
convert at least a portion of the at least one multimedia content to the plurality of sentences.

11. The system of claim 10, wherein the processor instructions further cause the processor to capture a plurality of attributes corresponding to the at least one multimedia content, wherein the plurality of attributes comprises at least one of facial expressions of a user involved in the conversation system, voice pitch and modulation of the user, or text characteristics.

12. The system of claim 11, wherein the plurality of sentiment vectors and the plurality of emotion vectors incorporate the plurality of attributes.

13. The system of claim 9, wherein the dependency vector for a sentence from the plurality of sentences corresponds to emotion and sentiment dependency of each word in the sentence with at least one preceding word in the sentence and at least one preceding sentence, and wherein the dependency vector is a pile-up vector for a sentiment vector and an emotion vector generated for the sentence.

14. The system of claim 13, wherein the dependency vector is generated based on an Auto Regressive Integrated Moving Average (ARIMA) model.

15. The system of claim 9, wherein the prosody waveform is generated during text to speech conversion.

16. The system of claim 9, wherein the processor instructions further cause the processor to generate facial expressions for at least one virtual avatar in the conversation system for the set of rephrased sentences and a remaining plurality of sentences based on the reshaped waveform.

17. A non-transitory computer-readable storage medium for automating repetitive task on a user interface, having stored thereon, a set of computer-executable instructions causing a computer comprising one or more processors to perform steps comprising:
generating an impact table comprising a plurality of sentiment vectors for sentiments associated with a plurality of sentences and a plurality of emotion vectors for emotions associated with the plurality of sentences, wherein a sentiment vector from the plurality of sentiment vectors comprises a sentiment weight assigned to each word of an associated sentence from the plurality of sentences, and wherein an emotion vector from the plurality of emotion vectors comprises an emotion weight assigned to each word of the associated sentence from the plurality of sentences;
generating for each of the plurality of sentences, a dependency vector based on the associated sentiment vector from the plurality of sentiment vectors and the associated emotion vector from the plurality of emotion vectors;

stacking the dependency vector generated for each of the plurality of sentences to generate a waveform representing variance in sentiment and emotions across words within the plurality of sentences;

altering at least one portion of the waveform based on a desired emotional output to generate a reshaped waveform, wherein variance in sentiment for the at least one portion is above a predefined threshold;

generating a set of rephrased sentences for a set of sentences associated with the at least one portion, based on the reshaped waveform, the set of sentences, and a user defined sentiment output; and generating a prosody for the set of rephrased sentences and a remaining plurality of sentences based on the reshaped waveform, wherein generating the prosody comprises:
- creating a composite sentiment profile based on a set of user requirements; and
- averaging a sentiment signal corresponding to the reshaped waveform to generate a prosody waveform based on the composite sentiment profile, wherein the prosody waveform is transposed into the prosody.

\* \* \* \* \*